US006009208A

United States Patent [19]
Mitra et al.

[11] Patent Number: 6,009,208
[45] Date of Patent: Dec. 28, 1999

[54] SYSTEM AND METHOD FOR PROCESSING SPACE-TIME IMAGES

[75] Inventors: Partha Pratim Mitra, Jersey City; David James Thomson, Murray Hill, both of N.J.

[73] Assignee: Lucent Technologies Inc., Murray Hill, N.J.

[21] Appl. No.: 08/517,481

[22] Filed: Aug. 21, 1995

[51] Int. Cl.$^6$ .................................................. G06K 9/40
[52] U.S. Cl. ........................ 382/254; 382/128; 382/275
[58] Field of Search .................................. 382/128, 254, 382/232, 248, 275; 128/653.2; 364/574

[56] References Cited

U.S. PATENT DOCUMENTS

| | | | |
|---|---|---|---|
| 5,010,504 | 4/1991 | Lee et al. .................................. | 364/574 |
| 5,490,516 | 2/1996 | Hutson ..................................... | 128/696 |
| 5,594,849 | 1/1997 | Kuc et al. ................................ | 395/135 |

OTHER PUBLICATIONS

Konstantinidas, K., et al., "Application of SUD based Spatial Filtering to Video Sequences," May 9, 1995, IEEE, pp. 2193–2196.

Primary Examiner—Jose L. Couso
Assistant Examiner—Matthew C. Bella

[57] ABSTRACT

A methodology is disclosed for processing image data to extract image information of interest from aggregate image information containing other interfering information. Application of the methodology also leads to significant compression in the data, which reduces storage requirements. With the methodology of the invention, an augmented linear decomposition of the image data is performed. Thereafter, components of the image data corresponding to a baseline image, image information introduced by non-regular extraneous factors, and image information related to random noise are removed from the data by suppression of appropriate terms of the linear decomposition. The image data so reduced may contain both image information of interest and image data related to regularly occurring extraneous factors. The image data of interest is removed from such reduced aggregate image data by frequency domain filtering of the reduced aggregate data.

29 Claims, 6 Drawing Sheets

TIME

OSCILLATORY COMPONENTS    UNCORRELATED NOISE (A)    (B)

SYSTEM AND METHOD FOR PROCESSING SPACE-TIME IMAGES

FIELD OF THE INVENTION

This application is related to image processing and more particularly to a method for separating image information of interest from aggregate image data.

BACKGROUND OF THE INVENTION

In the art of image processing, it will often be the case that image information of interest is intermixed with, or even masked by other image information which is not of interest. Thus an objective in such cases will be a separation of the image information of interest from the information which is not of interest. An important image processing application in which this objective may come into play is found in the field of non-invasive imaging of anatomical structures and physiological processes. An exemplary such application is Magnetic Resonance Imaging ("MRI"), and particularly the MRI subclass known as functional Magnetic Resonance Imaging ("fMRI") which has been shown to be particularly useful in the identification of parts of the brain associated with specific cognitive processes. Hereafter fMRI will be used both to illustrate the problems solved by the invention and as a preferred embodiment of the invention. It will be understood however that the invention is broadly applicable to the processing of image data generally, particularly to such images generated in a medical or clinical environment.

As will be known to those skilled in the art, functional Magnetic Resonance Imaging of the brain holds great promise as a tool to elucidate the functioning of the human brain [See, for example, applications of fMRI described in S. Ogawa et al., "Intrinsic signal changes accompanying sensory stimulation: Functional brain mapping with magnetic resonance imaging", *Proc. Natl. Acad. Sci. USA*, 89 5951 (1992) and K. K. Kwong et al., "Dynamic magnetic resonance imaging of human brain activity 5 during primary sensory stimulation", *Proc. Natl. Acad. Sci. USA*, 89 5675 (1992)]. Changes in the oxygen content in cerebral blood causes small but detectable changes in an MR image. Since the oxygen content of the blood is known to be locally dependent on brain activity, detection of such changes in oxygen content provides a particularly reliable indicator of moment-to-moment brain function. There are, however, problems that limit the full utility of this technique. A major problem is that signal levels for changes in the image related to function are fairly small, and could well be lost among unwanted sources of image fluctuation. Such undesirable variations in the image include incoherent noise, approximately periodic fluctuations arising from physiological sources—e.g., cardiac and respiratory cycles, and motion of the experimental subject. Previous data analysis techniques have generally relied on statistical tests of significance to extract spatial maps of brain regions showing correlations with a stimulus timecourse. [See for example, P. A. Bandettini et al., "Processing Strategies for Time-Course Data Sets in Functional MRI of the Human Brain", *Magnetic Resonance in Medicine*, 30 161 (1993)].

The conventional data analysis approaches generally have three drawbacks:

(i) they do not take into account the complete structure of the signal and the noise, thus preventing optimal detection of the signal;

(ii) such methods essentially produce maps of static brain regions, and it is difficult to assess the full spatio-temporal nature of the image signal in this way; and (iii) an analysis methodology based on looking for changes correlated to the stimulus time course prevents detection of events that do not appear in synchrony with the stimulus.

As is known, techniques have been suggested in attempts to overcome the above drawbacks. To alleviate (ii), maps have been produced showing correlations with several shifted versions of the stimulus time course [See, E. A. DeYoe et al., "Functional Magnetic Resonance Imaging of the Human Brain", *J. Neuroscience Methods*, 54 171 (1994)]. To avoid drawback (iii), the use of Principal Component Analysis (or equivalently Singular Value Decomposition) has been proposed to extract coherent changes in the signal that are not necessarily locked to the stimulus time course. [See J. R. Baker et al., "Statistical Assessment of Functional MRI Signal Change", 2 626, *Proceedings of the Society of Magnetic Resonance, Second Meeting* Aug. 6–12, 1994, San Francisco, Calif.] However, such proposals have not led to a comprehensive solution to the full problem.

SUMMARY OF THE INVENTION

A methodology is presented, and a system for carrying out that methodology, for processing image data to extract image information of interest from aggregate image information containing other interfering information. Application of the methodology also leads to significant compression in the data, which reduces storage requirements. The methodology involves using an augmented linear decomposition of the image data, followed by frequency domain analysis and decomposition using multiple window techniques. The frequency domain analysis is augmented by subtraction of nuisance signals coherent with auxiliary time series which are simultaneously monitored. In carrying out the methodology of the invention, raw image data is formed into a matrix with spatial coordinates of that data along one dimension of the matrix and time along another dimension. That image data matrix is thereafter augmented in both the spatial coordinate and time dimensions by the addition of space and time shifted versions of the input data. The resultant matrix is then linearly decomposed into a sum of outer products of static images and time courses. Components of the image data corresponding to a baseline image, image information introduced by non-regular extraneous factors, and image information related to random noise are removed from the data by suppression of appropriate terms of the linear decomposition. The image data so reduced may contain both image information of interest and image data related to regularly occurring extraneous factors. The image data of interest is removed from such reduced aggregate image data by frequency domain filtering of such reduced aggregate data.

DETAILED DESCRIPTION OF THE INVENTION

Figure 1:
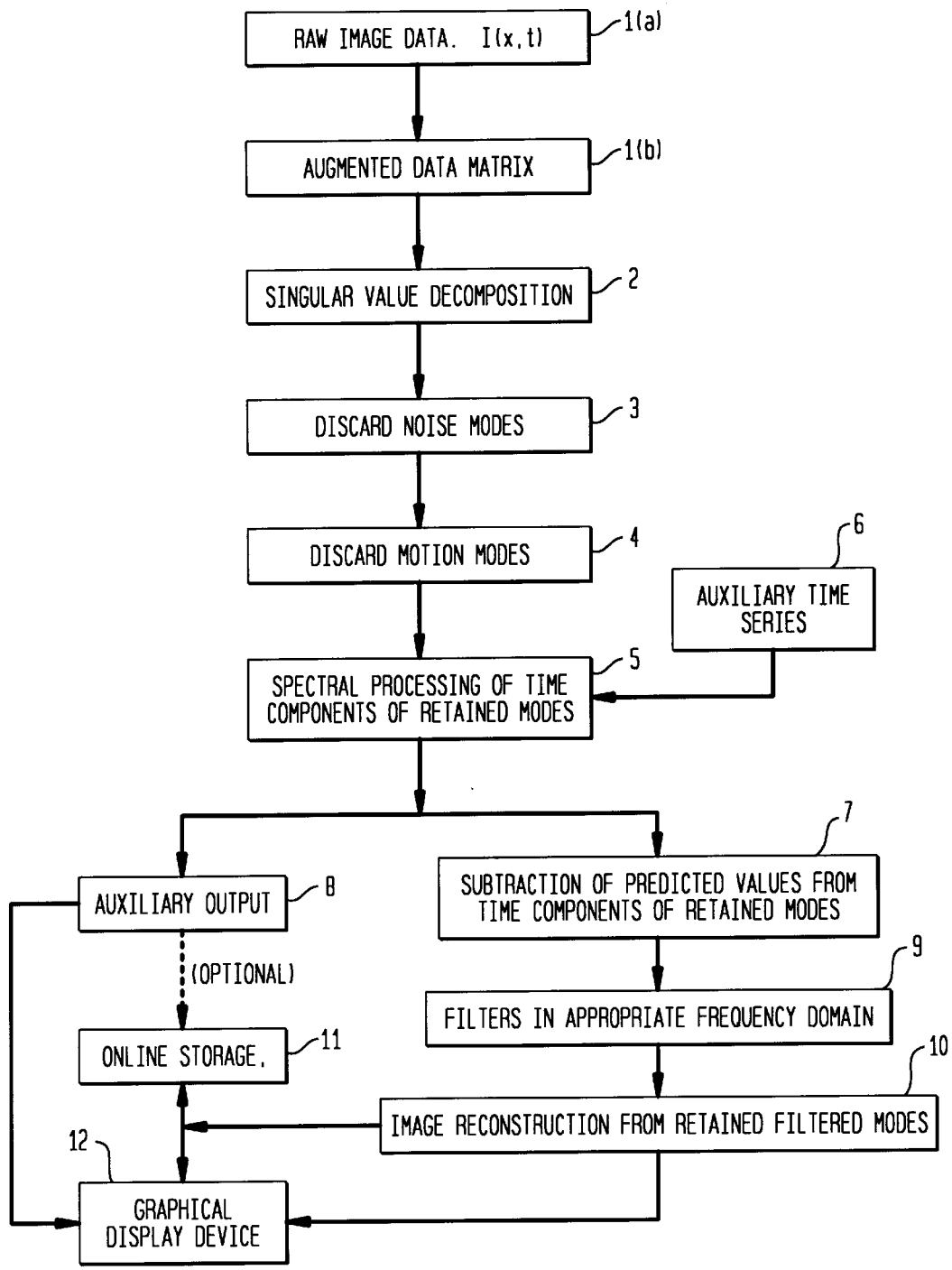
FIG. 1 provides a flow diagram of the overall methodology of the invention.

For clarity of explanation, the illustrative embodiment of the present invention is presented as comprising individual functional blocks (including functional blocks labeled as "processors"). The functions these blocks represent may be provided through the use of either shared or dedicated hardware, including, but not limited to, hardware capable of executing software. For example the functions of processors presented in FIG. 5 may be provided by a single shared processor. (Use of the term "processor" should not be construed to refer exclusively to hardware capable of executing software.)

Illustrative embodiments may comprise microprocessor and/or digital signal processor (DSP) hardware, such as the AT&T DSP16 or DSP32C, read-only memory (ROM) for storing software performing the operations discussed below, and random access memory (RAM) for storing results. Very large scale integration (VLSI) hardware embodiments, as well as custom VLSI circuity in combination with a general purpose DSP circuit, may also be provided.

To overcome the previously-described limitations in the prior art, a methodology has been developed for processing space-time imaging data, and that methodology will be described hereafter in the context of a preferred embodiment—the processing fMRI data. It will readily be seen, however, that the methodology of the invention is applicable to a broad array of image processing applications, particularly other medical imaging applications, such as angiography. In the illustrative fMRI embodiment, the methodology of the invention takes into account the detailed structure of signal and noise in fMRI data, thus allowing extraction of fairly small functionally relevant changes in the brain image. The end result is a "movie" of changes in the brain image that are relevant to function.

Because the discussion following is focused on an application of the methodology of the invention to fMRI data, it is believed that a brief discussion of MRI and fMRI will facilitate a better understanding of the invention. The basic methodology of Magnetic Resonance Imaging involves application of a powerful magnetic field to force the magnetic axes of hydrogen nuclei in a subject's water molecules (which constitute 70 percent of the human body) into partial parallel alignment. Then a radio pulse is applied to the partially aligned hydrogen nuclei, thereby causing the protons of those nuclei to be excited. As those excited protons "relax" from the excited state, they emit small, but detectable radio signals. Based on the time it takes for those nuclei to relax, which generally depends on how many interacting nuclei there are nearby as well as the local magnetic environment for such nuclei, and thus on the density of the tissue being scanned, a computer driven algorithm is able to construct an image of the anatomical structure being scanned.

While conventional MRI is intended to image anatomical structures, the goal of the newer functional MRI is to show images of functionally induced physiological changes, particularly the detection of neuronal activity in the brain. The essential bases for this fMRI application are the phenomena that an increase in oxygen occurs in an area of heightened neuronal activity and that the amount of oxygen carried by the blood's hemoglobin affects the magnetic properties of the hemoglobin. Ogawa, et al. at AT&T Bell Laboratories has demonstrated that the small magnetic fluctuations associated with the hemoglobin oxygen in an area of heightened neuronal activity can be detected by MRI [See S. Ogawa et al., "Intrinsic signal changes accompanying sensory stimulation: Functional brain mapping with magnetic resonance imaging", id., and references 1–3 cited therein].

As will be appreciated, functional Magnetic Resonance Imaging and other methods for dynamic brain imaging have great potential, both for studies of brain function and in future clinical settings. However, the changes in the images are nominally comparable to fluctuations arising from various noise sources, thus making their direct study problematic. In addition, such experiments generate large quantities of data, which cannot be stored on-line beyond a limited extent, thus putting limits to the accessibility and usefulness of large sets of data. Further limiting the utility of these imaging techniques is the fact that most of the analysis is performed off line, thus precluding for the most part direct feedback into the measurement process.

An image analysis methodology has been developed which overcomes each of these limitations and that methodology will be described in detail below. First, however it is useful to briefly discuss several characteristics of FMRI data which relate to the functioning of this methodology. Initially it is noted that part of the noise associated with an fMRI image is uncorrelated in space as well as time, whereas the signal changes—e.g., as related to the heightened neuronal activity, are coherent. In addition, if the image data is considered as a two dimensional matrix with the spatial coordinates arranged along one axis and time along the other, this matrix is found to be close to a low rank matrix. As will be explained in the following discussion of the methodology of the invention, these two observations lead to the use of a specially augmented Singular Value Decomposition as a component in that methodology. Secondly, the physiological oscillations—as from breathing and heartbeat, are relatively coherent, so that even when subsampled, they can be concentrated at the high frequency end of the spectrum with judicious choice of the sampling frequency. The signal changes, on the other hand, are fairly slow, and occur at the low frequency end of the spectrum. These characteristics allow for separation between signal and physiological noise on the basis of frequency filtering.

I. Description Of The Preferred Embodiment

A. Methodology of the invention

From time to time in the description of the invention, certain relationships will, for convenience of presentation, be stated in algebraic form. To that end the image data generally will be referred to in algebraic notation by the designation I and the fact that such image data includes a combination of spatial and temporal components will be represented algebraically as $I(x,t)$, where x represents the spatial components and t represents the temporal components.

Figure 2:
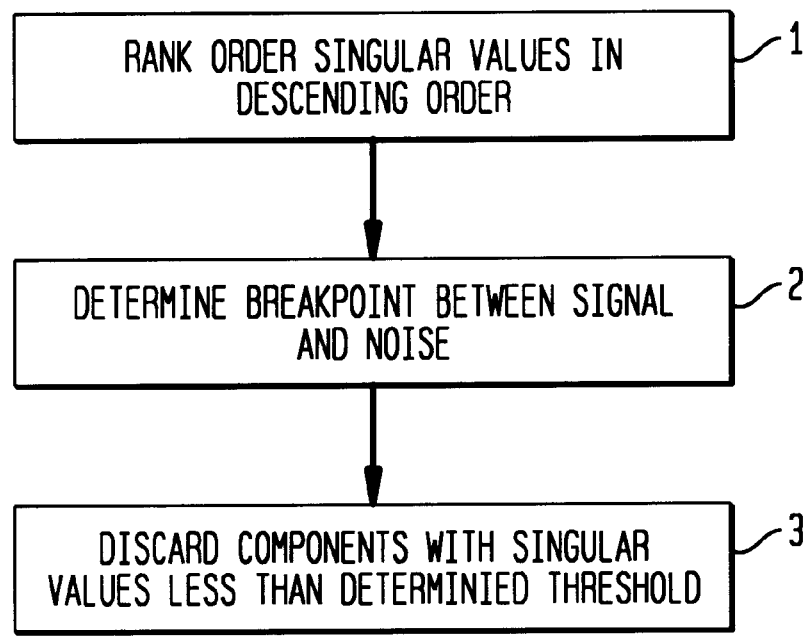
FIG. 2 provides a flow diagram of substeps related to the methodology step of discarding noise modes.
Figure 3:
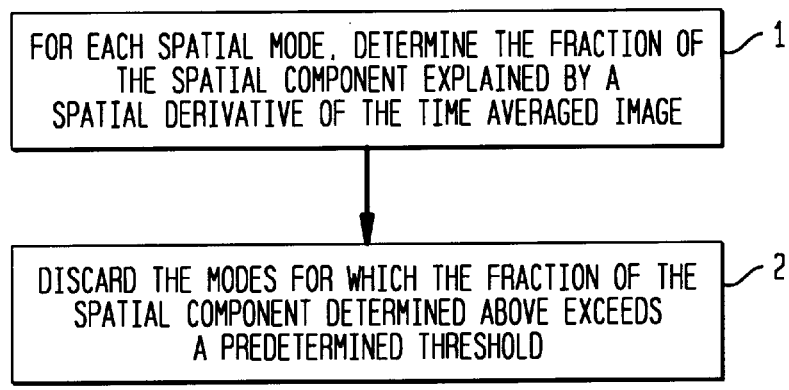
FIG. 3 provides a flow diagram of substeps related to the methodology step of discarding motion modes.
Figure 4:
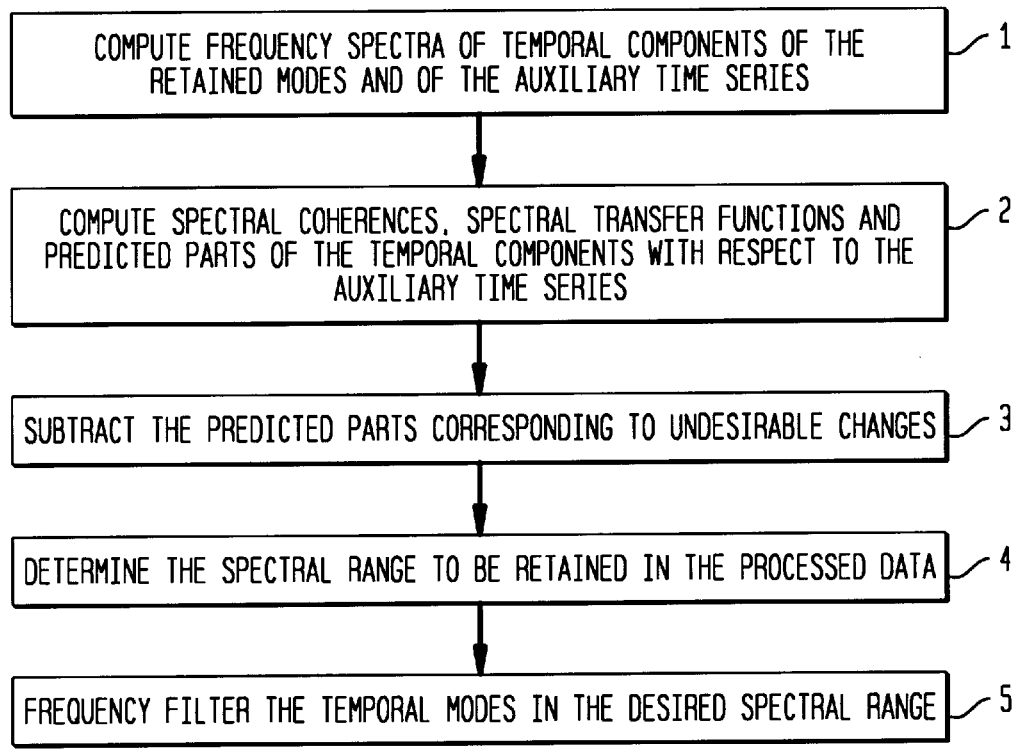
FIG. 4 provides a flow diagram of substeps related to the methodology step of spectral processing of temporal components.

In the following discussion of the steps in the methodology of the invention, reference will be made from time to time to corresponding blocks in the flow diagrams of FIGS. 1–4. As will be seen from these figures, FIG. 1 provides a flow chart of the overall process of the invention and FIGS. 2–4 provide additional detail for individual steps in that overall process.

As preliminary step in the image processing according to the invention, the images may be masked in space, typically to remove small pixel values or undesirable parts of the image. As an optional further preliminary processing step, the baseline of the image I may be removed by processing $\log(I/I_0)$ or $(I-I_0)/I_0$, where $I_0$ is the relevant baseline image, which may, for example, be taken to be the average image over a fixed period of time. In the description below, it is assumed that this optional step has been performed. However, the methodological changes which are made necessary if that preliminary step is not performed are minor, and will be described at the appropriate step.

Note that while the discussion herein is focused on image data consisting in general of real valued pixels (the predominant case), an MRI application will occasionally require dealing with complex valued pixels. Such images consisting of complex numbers can be treated in the same manner as in the method described herein with insignificant changes. Such changes will be apparent to those skilled in the art.

A1. Augmentation of Data by Space and Time Lags

The raw image data $I(x,t)$ to be operated on by the invention consists of a temporal sequence of two or three dimensional spatial images. (To reflect the multi-dimensionality of the spatial image, the algebraic notation $I(x,y,t)$ may be used for the two dimensional case and $I(x,y,z,t)$ for the three dimensional case, where x, y & z represent spatial dimensions.) For purposes of illustrating the method of the invention, an assumption is made that the image data to be processed is comprised of N images (corresponding to N time frames), with each image containing M pixels. The image data is put into a two dimensional matrix format of the form below by arranging time along one of the dimensions and the pixel number on the other dimension.

$$\begin{vmatrix} I(x_1, t_1) & \ldots & I(x_1, t_N) \\ \vdots & & \vdots \\ I(x_M, t_1) & \ldots & I(x_M, t_N) \end{vmatrix}$$

This matrix is then augmented (step 1(b) of FIG. 1) in the space direction by adding time shifted copies, and in the time direction by adding spatially shifted copies. In the illustrative example of such an augmented matrix according to the invention as shown below, the matrix is augmented by appending p time shifted copies of the original matrix and then appending q space shifted copies of this matrix to itself, to produce an augmented matrix with dimensions $M(p+1) \times N(q+1)$. For notational convenience, the $M(p+1)$ term will hereafter generally be referred to as M' and, similarly, the $N(q+1)$ term will be referred to as N'.

The purpose of the augmentation is to take into account a priori spatio-temporal correlations present in the signal part of the images. The number of time or space lags are adjustable parameters which will be determined by characteristics of the data, namely expected correlation lengths in space and time, as well as by the processing power available—i.e., the matrices have to fit in the available memory and not require an excessive amount of CPU time. Typically, the number of lags in either direction is expected to equal a small integer between 0 and 10.

A2. Singular Value Decomposition of Augmented Data Matrix

As depicted in step 2 of the flow chart in FIG. 1, a Singular Value Decomposition (SVD) is performed on the augmented matrix. The result of the SVD is to produce a set of $N_s$ modes, where $N_s = \min(M', N')$. The decomposition is represented by the sum:

$$\tilde{I}(x, t) = \sum_{n=1}^{N_s} \lambda_n J_n(x) T_n(t) \tag{1}$$

where $\lambda_n$ are the singular values, $J_n(x)$ the eigenimages and $T_n(t)$ are the eigen time courses. It is to be noted here that the augmented matrix is not required for the subsequent steps in the methodology of the invention, it being utilized only in the SVD procedure. Accordingly, in the description of those subsequent steps, it should be understood that only parts of the modes corresponding to the original data set are displayed—i.e., the eigenimages and time courses are clipped to the original size. Thus in subsequent references to $J_n(x)$, only the first M components of that vector are being referred to, and, similarly for $T_n(t)$, only the first N time frames.

A3. Discarding Uncorrelated Noise Modes

As indicated in the flow diagram of FIG. 1, the next step in the image processing methodology of the invention is the elimination of noise modes, shown as step 3 of the figure. Substeps related to this step are further depicted in FIG. 2. In this step, the resultant decomposition components are ranked by the Singular Values (substep 1 of FIG. 2). Empirical observation shows that for the relevant image data, one obtains relatively few large Singular Values, corresponding roughly to interesting—i.e., spatio-temporally correlated—signal data, and a large majority of small Singular Values forming a noise "tail". The breakpoint between the signal and the noise is determined by comparison with a theoretical formula giving the distribution of the Singular Values of a matrix containing completely uncorrelated entries. For an $M' \times N'$ matrix having independent identically distributed entries with variance $\sigma^2$ the density function of Singular $$\begin{vmatrix} I(x_1, t_1) & \ldots & I(x_1, t_N) \\ \vdots & & \vdots \\ I(x_M, t_1) & \ldots & I(x_M, t_N) \\ \blacksquare & & \blacksquare \\ \blacksquare & & \blacksquare \\ \blacksquare & & \blacksquare \\ \blacksquare & & \blacksquare \\ I(x_1, t_1 + p) & \ldots & I(x_1, t_N + p) \\ \vdots & & \vdots \\ I(x_M, t_1 + p) & \ldots & I(x_M, t_N + p) \end{vmatrix} \blacksquare \blacksquare \blacksquare \blacksquare \blacksquare \blacksquare \begin{vmatrix} I(x_1 + a_q, t_1) & \ldots & I(x_1 + a_q, t_N) \\ \vdots & & \vdots \\ I(x_M + a_q, t_1) & \ldots & I(x_M + a_q, t_N) \\ \blacksquare & & \blacksquare \\ \blacksquare & & \blacksquare \\ \blacksquare & & \blacksquare \\ \blacksquare & & \blacksquare \\ I(x_1 + a_q, t_1 + p) & \ldots & I(x_1 + a_q, t_N + p) \\ \vdots & & \vdots \\ I(x_M + a_q, t_1 + p) & \ldots & I(x_M + a_q, t_N + p) \end{vmatrix}$$

Augmented Matrix

Values λ is given by $$P(\lambda) = \left(\frac{1}{\pi\sigma^2\lambda}\right)\sqrt{(\lambda_{max}^2 - \lambda^2)(\lambda^2 - \lambda_{min}^2)} \quad (2)$$

and the relationship among $\lambda_{max}, \lambda_{min}$ and σ is provided by the equations:

$$\lambda_{min} = \sigma\sqrt{M' + N' - 2\sqrt{M' \times N'}} \quad (3)$$

$$\lambda_{max} = \sigma\sqrt{M' + N' - 2\sqrt{M' \times N'}} \quad (4)$$

The expected cumulative distribution function of the Singular Values in the noise tail F(λ) is given by $$F(\lambda) = \int_{\lambda_{min}}^{\lambda} P(l)dl \quad (5)$$

While the augmentation by lags introduces some degree of correlation into the noise, as long as the number of lags (p,q) remains much smaller than the dimensions of the original data set (M,N), this introduces negligible error in the resultant produced by equation (2) above. However, in the event material error is encountered, the appropriate distribution of the noise Singular Values may be determined by Monte Carlo methods.

To determine the breakpoint between signal and noise (substep 2 of FIG. 2), the singular values are sorted in descending order and plotted against the ordinal number. On the same graph, λ is plotted versus $(F(\lambda_{max})-F(\lambda))*N_s$. $F(\lambda)$ is determined by a single unknown constant σ. This unknown constant is determined by equation (3) from $\lambda_{min}$. The $\lambda_{min}$ value is estimated from the tail of the noise spectrum.

Figure 2A:
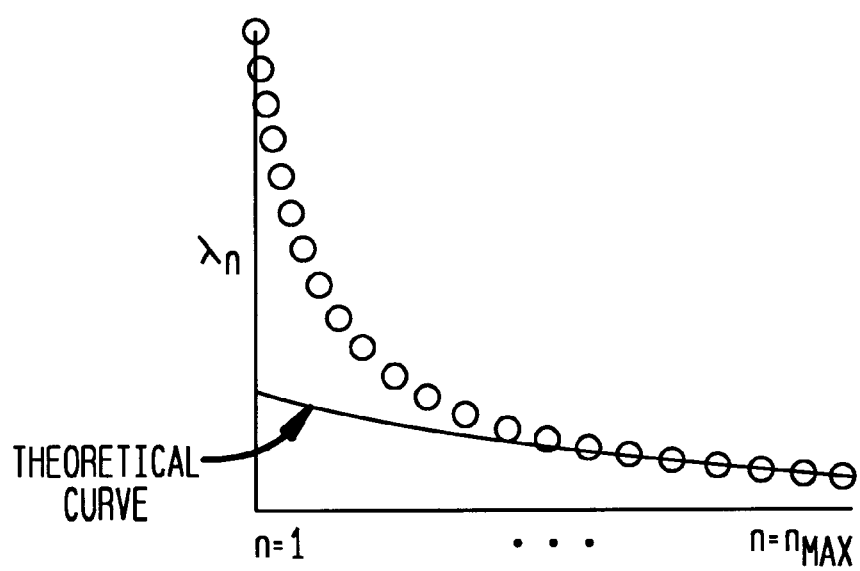
FIG. 2A shows an illustrative graph of Singular Values plotted against the ordinal number.

An illustrative example of such a singular value graph is shown in FIG. 2A. This curve will correspond to the singular values in the tail. The cutoff is determined when the singular values are greater than the theoretical curve by some predetermined amount, e.g., 50%. The components with singular values less than the predetermined threshold are discarded (substep 3 of FIG. 2) with the number of retained modes being designated $N_{cutoff}$.

Note that if the optional preliminary step of removing the image baseline was not taken, it can be implemented at this step by discarding the modes whose spatial components correspond to the average image.

A4. Discarding Motion Modes

Referring again to the flow diagram of FIG. 1, the step of eliminating the motion modes is shown at step 4 of the figure. Substeps related to this step are further depicted in FIG. 3. In this step, which operates on the truncated set of modes obtained above, the modes corresponding to global motion are to be discarded. This is done by selecting modes for which a difference between spatial components and a spatial derivative of the average image is less than a predetermined threshold (substeps 1 & 2 of FIG. 3).

Algebraically, the truncated set of modes to be addressed in this step can be represented as $$\tilde{I}_{tr}(x, t) = \sum_{n=1}^{n_{cutoff}} \lambda_n J_n(x) T_n(t) \quad (6)$$

From this truncated set, a determination is made as to which n, $J_n(x)$ resembles a spatial derivative of the original image averaged over time. To make this determination, the following minimization is performed:

$$\min_{\vec{a}} \|J_n(x) - (+\vec{ia}\cdot)\bar{I}(+\vec{ix})\| = \epsilon_n$$

Here $\vec{a}$ is a variable determined by the above minimization; also $$\bar{I}(\vec{x}) = \frac{1}{N}\sum_{t=1}^{N} I(\vec{x}, t)$$

and the quantity $\|J_n(x) - (\vec{a}\cdot\vec{\nabla})\bar{I}(\vec{x})\|$ is by definition equal to $$\sqrt{\sum_{i,j} M_{i,j}^2}.$$

If $\epsilon_n$ is smaller than a predetermined threshold, mode n is discarded (substep 2 of FIG. 3).

The selection of motion modes may be aided by comparing the corresponding time modes with auxiliary time series corresponding to measurements of motion of the subject being imaged.

After the above steps have been carried out, a residual set of modes are obtained, which are used for further processing, and which are herein denoted by S.

A5. Determination of Spectra. Coherences and Predicted Modes

The time components of the modes that are retained are now subjected to spectral analysis, as depicted in step 5 of the flow diagram in FIG. 1 and substeps 1 and 2 of the flow diagram of FIG. 4. The frequency spectra of the temporal modes and of the auxiliary time series—e.g., monitored time series corresponding to physiological oscillations—are estimated (substep 1 of FIG. 4), followed by determination of the spectral coherences of the temporal modes, with respect to the auxiliary time series (substep 2 of FIG. 4). Although the spectral analysis may be performed in several alternative ways, for the preferred embodiment of the invention, this analysis is performed using multi-taper or multi-window methods, as described in D. J. Thomson, "An Overview of Multiple-Window and Quadratic-Inverse Spectrum Estimation Methods", VI 185–194, *Proceedings—IEEE ICASSP*, Apr. 19–22, 1994. Multiple window analysis methods are particularly well suited since they can handle relatively short time series fairly automatically. (As is known, image data acquired from MRI is necessarily of short duration because the human subject cannot be kept in the MRI machine for an extended period of time.) Additionally, it is noted that other spectral analysis methods tend to lose the ends of the relevant time series, and are often less robust than the multiple-window methods.

These multiple-window methods are also used to obtain those parts of the time modes $T_n(t)$ which would be predicted on the basis of the auxiliary time series $A_i(t)$. This is done by calculating the spectral transfer function using multi-taper methods, and using the spectral transfer functions to calculate predicted parts $T_n^P(t)$ of the temporal modes.

The auxiliary time series often constitute undesirable components of the image. In that case, the predicted parts, $T_n^P(t)$, are subtracted from the temporal modes, $T_n(t)$, to obtain residual parts of the temporal modes. (Step 7 of FIG. 1 and substep 3 of FIG. 4) Algebraically, $$T_n^R(t) = T_n(t) - T_n^p(t) \quad (7)$$

In this case, the spectra of the temporal modes and the spectral coherences of the temporal modes with the auxiliary time series are also used to determine a frequency range (typically low frequencies with a frequency cutoff) which can be expected to contain the desired signal. (Substep 4 of FIG. 4) This frequency range is used in the frequency filter step described below.

It is noted that in some cases, it may be desirable to obtain precisely those parts of the image which correspond to one of the auxiliary time series—e.g., the monitoring time series for cardiac function. Such a need could arise in the context of studying the dynamics of blood flow using MRI—e.g., as in angiography. In such cases, it is the predicted part of the temporal modes corresponding to the desired auxiliary time series that would be retained. Also, the spectral range for the frequency filter described below would also be appropriately determined from the spectra and coherences determined above.

A6. Frequency Filtering of Retained Temporal Components

The retained temporal components are frequency filtered to retain only components in the spectral range determined above. (Step 9 of FIG. 1 and substep 5 of FIG. 4) While such filtering may be performed in various ways, for the preferred embodiment, projection filters based on multi-taper methods (as described in D. J. Thomson, "Projection Filters For Data Analysis", P39–42, *Proceedings—IEEE Seventh SP Workshop On Statistical Signal And Array Processing*, Jun. 26–29, 1994) are used. These filters are particularly suitable for the application in the methodology of the invention since they minimize loss of the ends of the time series. This is important because the relevant time series are typically short. These filters also have excellent resistance towards spectral leakage. After application of these filters, the appropriately filtered temporal modes $T_n^f(t)$ are obtained.

A7. Reconstruction and Display

A further step in the process of the invention involves reconstructing a movie of the retained, filtered modes (step 10 of FIG. 1), as given by the equation $$I_R(x, t) = \sum_{n \in S} \lambda_n J_n(x) T_n^f(t) \quad (8)$$

This movie, containing the desirable changes in the image, may be displayed on a graphical display unit. The original data set may be two or three dimensional in space. If the data set is two dimensional, a three dimensional rendering of the appropriate anatomical setting is prepared, and the movie displayed in a two dimensional section of this rendered object. If the original data set is three dimensional, the corresponding movie is three dimensional, but has to be displayed, as for the two dimensional case, by choosing an appropriate section. This section may however be changed in time, thus revealing the full three dimensional structure. Alternative display methods which are more suitable for displaying three dimensional movies may also be used.

It should be understood that the auxiliary data may be displayed as well, to monitor the experiment as well as the image processing. On-line viewing of the final movie, as well as of the auxiliary data, may be used to provide valuable feedback towards experimental design.

B. Illustrative Example

Figure 6:
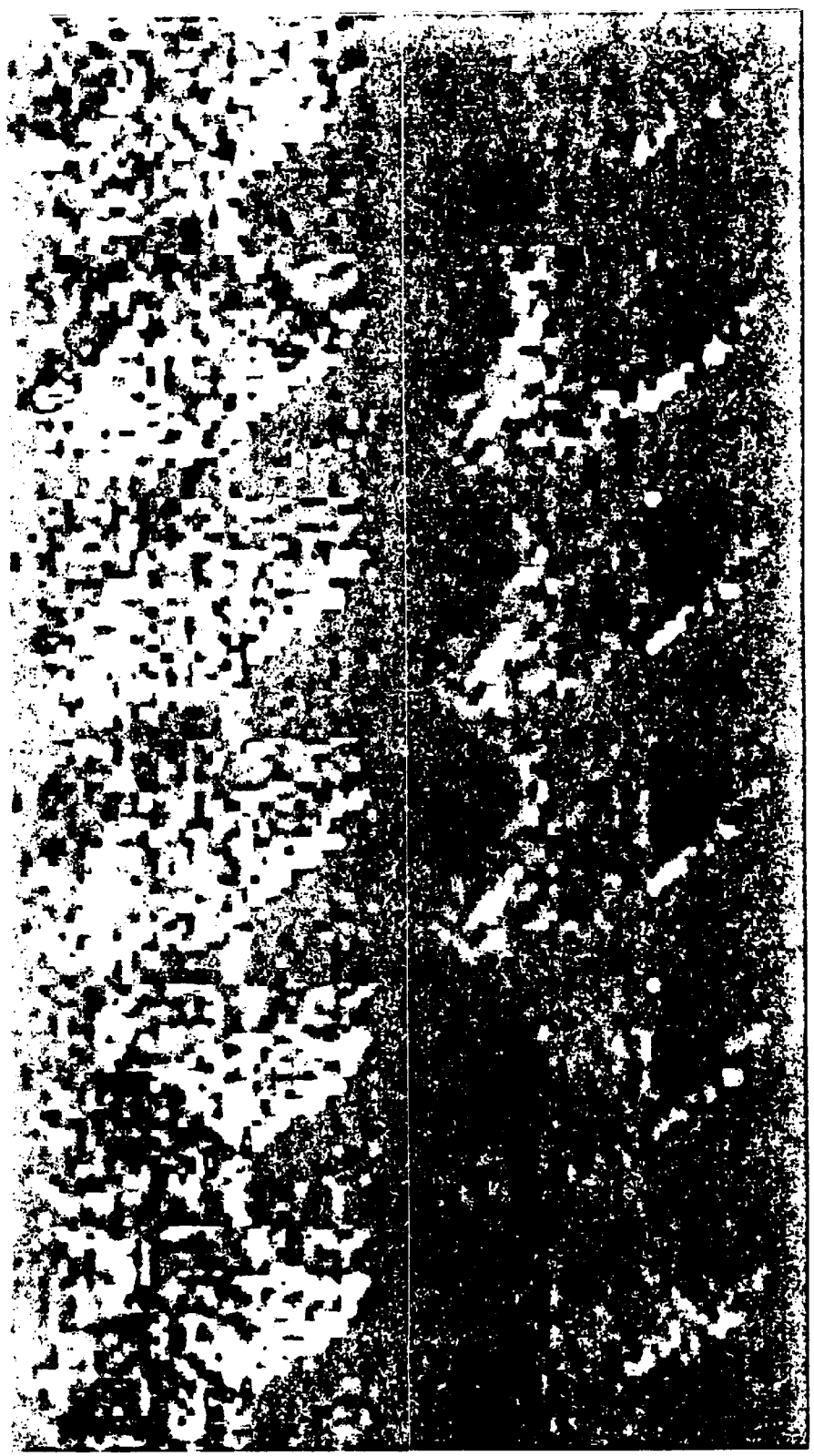
FIG. 6 provides a reproduction of fMRI data processed according to the invention with a juxtaposition of raw data and the extracted signal data.
Figure 7:
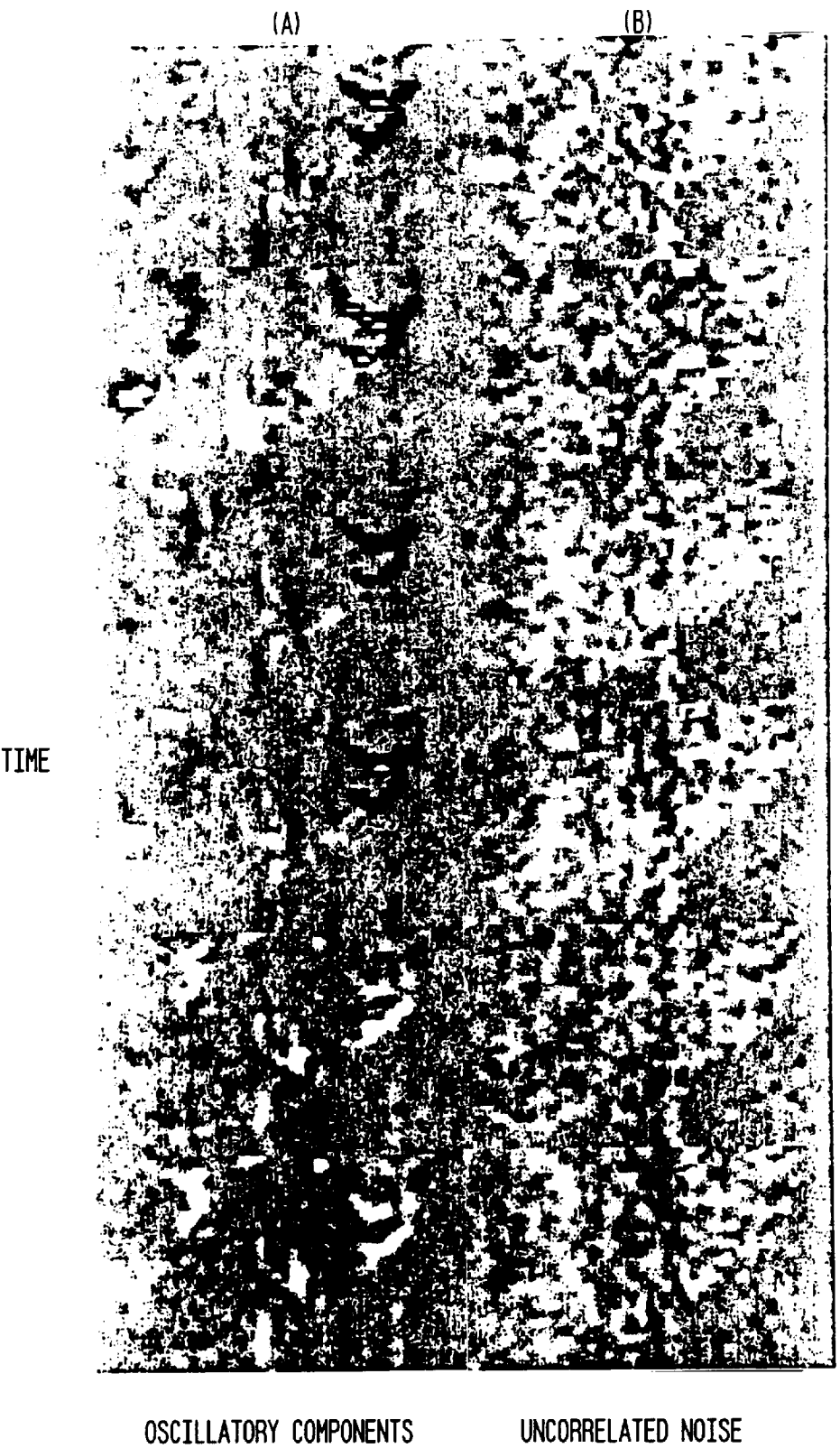
FIG. 7 provides a reproduction of unwanted FMRI data eliminated by the process of the invention, specifically oscillatory and noise components.

The inventors have applied the methodology of the invention to actual fMRI data—specifically neuronal response to visual stimulation. FIGS. 6 and 7 show representative images from that application. As will be seen, FIG. 6(A) shows the raw data from the MRI process, containing both the neuronal activity signal of interest and other image information which largely masks that information of interest. Juxtaposed against that raw data image, in FIG. 6(B), is an image of the desired neuronal signal data, after removing oscillatory component image information and uncorrelated noise image information according to the process of the invention. Representative image data for the removed oscillatory component image information and uncorrelated noise image information are shown respectively in FIGS. 7(A) and 7(B).

C. Hardware Implementation Of Invention

Figure 5:
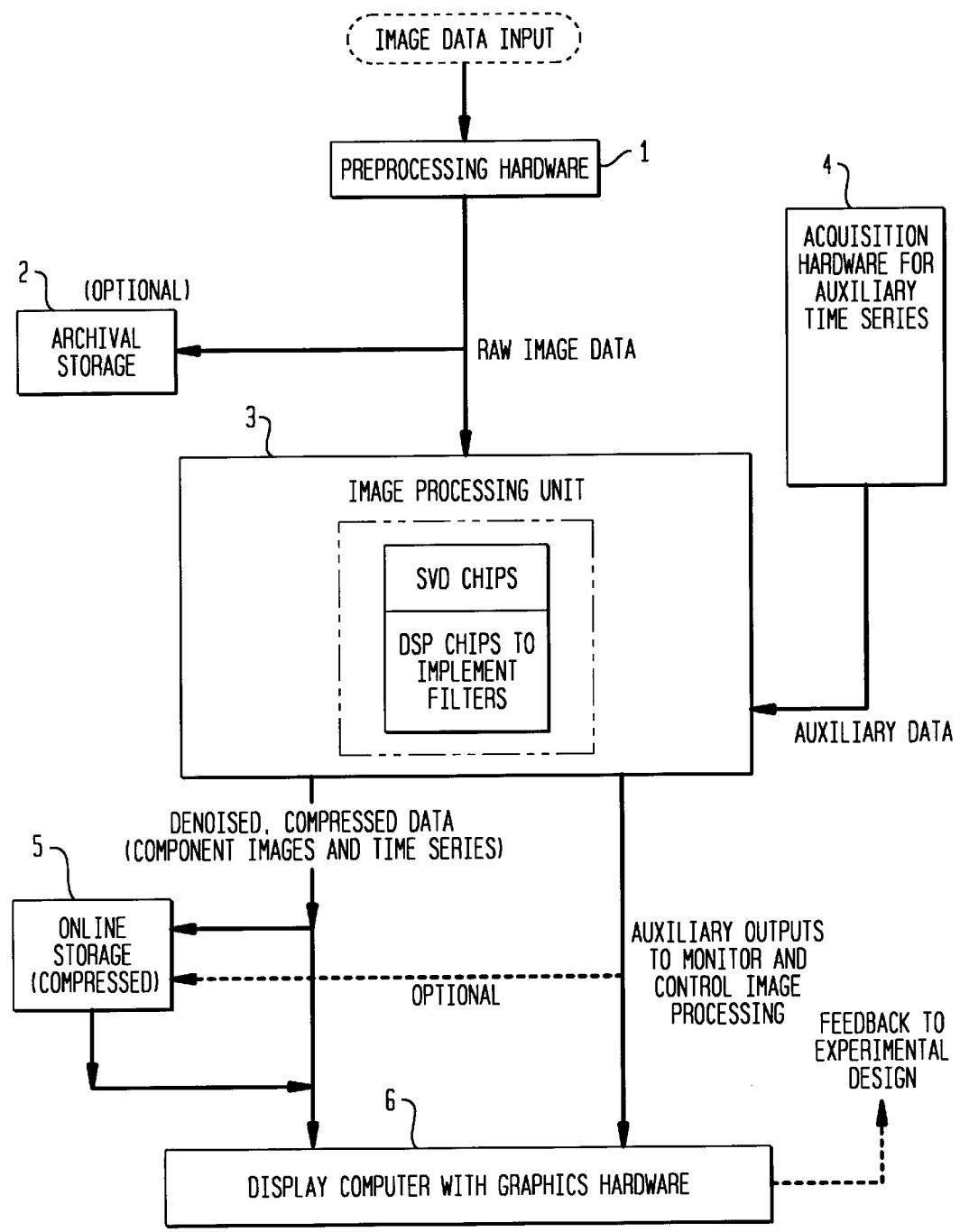
FIG. 5 shows in schematic form a hardware implementation of the invention.

With the background of the methodology of the invention as disclosed in the previous section, a hardware implementation of the methodology will now be described, which implementation is presented schematically in FIG. 5. An important advantage of this hardware implementation is that it could be incorporated within or networked to the MRI computer processor, thereby enabling on-line processing and display of the changing images, and accordingly providing direct feedback into the measurement.

In the operation of the invention, raw image data will be acquired after preprocessing by Preprocessing Hardware 1. That raw image data, which may typically be fMRI data, is input to Image Processing Unit 3 for processing in accordance with the method of the invention. Simultaneously, that data can, if desired, also be transferred to Archival Storage unit 2 for archival purposes.

Matrix Augmentation and Singular Value Decomposition are performed according to the method of the invention by Image Processing Unit 3. This and other functions of Image Processing Unit 3 could be performed by a dedicated general purpose computer. However, because the SVD analysis is a computationally intensive step, a preferred implementation of this function (which would be particularly important for an on-line implementation) incorporates specialized SVD Processor Chips, 3A, for performing the SVD functions. This function can also be achieved using processor arrays, and, if the augmented matrices are not too large, the corresponding computation may be performed on-line on a workstation or personal computer. Of course, the procedure may also be performed off line.

Determination of Spectra, Coherences and Predicted Modes according to the method of the invention will also be performed by Image Processing Unit 3. Because these functions are also computationally intensive, at least where on-line implementation is to be carried out, these computations would desirably be performed using specially programmed DSP Chips, as shown at 3B of FIG. 5.

An output of Image Processing Unit 3 would be the de-noised, compressed image data, consisting of component images and time series, determined according to the method of the invention. Optionally, Image Processing Unit 3 may also provide an auxiliary output, such as spectra and coherences, for purposes of monitoring and controlling image processing. These outputs from Image Processing Unit 3 are fed to a graphic display means, which carries out the reconstruction and display functions of the invention, and, as well, may optionally be directed to Online Storage unit 5.

The reconstruction and display functions carried out by that graphic display means are computationally expensive, and therefore that graphic display means will preferably will be implemented in a separate Graphics Display Computer 6. That Graphics Display Computer will carry out the function of reconstruction of de-noised data in the form of a two or three dimensional movie, rendered in an anatomical background image. That Graphics Computer may also provide a display of auxiliary information in a form of spectra and coherences with auxiliary time series.

C. Data Compression Utility

As will be recalled, in the preferred embodiment of the invention, the original data set consists of M×N numbers, whereas the modes to be retained contain $(M+N) \times N_R$ numbers, where $N_R$ is the size of the set S of retained modes. This means the storage requirements for the retained modes are lower than that for the raw data by a factor of $N_R \times (M+N)/(M \times A)$. This number is typically found to be less than 0.1, implying a data compression by at least a factor of ten. In addition, since the retained modes are typically frequency filtered, the retained time series can be appropriately compressed. The inventors have determined empirically that for typical data sets of MRI images, one can obtain overall compressions by a factor of between ten and a hundred. This compression greatly reduces memory requirements for storage, and makes on-line storage possible simultaneously for numerous data sets. Given the same available memory, at least $(M \times N)/N_R \times (M+N)$ more data sets can be stored simultaneously. The compression is particularly efficient in the methodology of the invention since the uncorrelated noise can be discarded, which is precisely the part of the data that is difficult to compress.

II. Conclusion

A novel image processing system and method has been shown herein which substantially enhances the quality of image data of interest derived from an image scanning process. While the invention has been described in terms of a preferred embodiment processing fMRI data, it will be apparent that the image processing techniques described here are of broad applicability to images generated in a medical or clinical environment. Moreover, while the discussion herein has been focused particularly on brain images, other parts of the body could be subject of similar imaging. Particular examples of other applications of the invention will include angiography, determination of pathological states by monitoring the dynamics of blood flow, as well as the processing of images generated by techniques such as acoustic imaging, important for clinical purposes, and optical imaging of neuronal function using various contrast mechanisms indicating activity in the neurons.

Image characteristics that make the analysis of the invention particularly useful are the presence of complex spatio-temporal components in the image time series, such as uncorrelated noise (which has to be eliminated), physiological oscillations such as heartbeat and breathing (which, depending on context, need either to be eliminated or extracted). Additionally, the facility of the invention to provide on-line visualization of otherwise noisy image changes provides an application of particular breadth and desirability for the methodology of the invention.

The methodology of the invention also produces a large compression of the image data, by factors ranging from ten to a hundred, a major part of the compression arising from discarding uncorrelated noise that is unnecessary for any subsequent analysis. The compressed data is suitable for online storage, and can be easily reconstructed into a movie showing the changes in the images directly.

Although the present embodiment of the invention has been described in detail, it should be understood that various changes, alterations and substitutions can be made therein without departing from the spirit and scope of the invention as defined by the appended claims. In particular, it should be seen that the techniques may be applied to other signal processing applications where the signals are characterized by a temporal dimension and at least one other dimension.

We claim:

1. A method for processing data having both temporal and spatial components to extract a desired portion of said data, comprising the steps of:

performing a linear decomposition of said data and selecting decomposition modes having component values that are above a first predetermined threshold value; and analyzing said selected decomposition modes to determine if a set of said selected modes exists in which a difference between ones of spatial components included in said set and a spatial derivative of an average of said data is less than a second predetermined threshold, and discarding any said set so determined, leaving a remainder of said selected decomposition modes.

2. The data processing method of claim 1 including the further steps of performing a spectral analysis on temporal components of said remainder; and frequency filtering of said modes in said remainder using frequency range determined in said spectral analysis step to select modes of said remainder within a range of said filter.

3. The data processing method of claim 2 wherein said spectral analysis step includes the sub-step of determining predicted parts of an auxiliary time series related to said data and subtracting said predicted parts from said temporal components, and wherein said frequency filtering step is applied to modes remaining after said subtraction.

4. The data processing method of claim 2 including the further step of reconstructing said extracted data into a form of a movie.

5. The data processing method of claim 1 wherein said step of performing a linear decomposition further includes the substeps of:

forming said data into a matrix with spatial coordinates of said data along one dimension of said matrix and temporal coordinates along another dimension;

augmenting said matrix in both said spatial and temporal dimensions by the addition of spatial and temporal shifted versions of said data.

6. A method for processing image data to extract a desired portion of said data, comprising the steps of:

performing an augmented linear decomposition of said image data and selecting decomposition modes having component values above a first predetermined threshold value;

analyzing said selected decomposition modes to determine a set of said selected modes in which a difference between ones of spatial components included in said set and a spatial derivative of an average of said image data is less than a second predetermined threshold, and discarding said set leaving a remainder of said selected decomposition modes;

performing a spectral analysis on temporal components of said remainder; and frequency filtering of said modes in said remainder using a frequency range determined in said spectral analysis step to extract said desired portion.

7. The image processing method of claim 6 wherein said spectral analysis step includes the sub-step of determining predicted parts of an auxiliary time series related to said image data and subtracting said predicted parts from said temporal components, and wherein said frequency filtering step is applied to modes remaining after said subtraction.

8. The image processing method of claim 6 including the further step of reconstructing said extracted image data into a form of a movie.

9. The image processing method of claim 6 wherein said image data is derived from images generated in a medical or clinical environment.

10. A method for processing image data to extract a desired portion of said data, comprising the steps of:
   forming said image data into a matrix with spatial coordinates of said data along one dimension of said matrix and time along another dimension;
   augmenting said matrix in both said spatial coordinate and said time dimensions by the addition of space and time shifted versions of said image data;
   causing said augmented matrix to be linearly decomposed into a plurality of modes having static image components and time course components;
   selecting decomposition modes having component values above a first predetermined threshold value;
   analyzing said selected decomposition modes to determine a set of said selected modes in which a difference between ones of spatial components included in said set and a spatial derivative of an average of said image data is less than a second predetermined threshold, and discarding said set leaving a remainder of said selected decomposition modes;
   extracting said desired portion of said data from said modes in said remainder by frequency domain filtering of said modes in said remainder.

11. The image processing method of claim 10 wherein said linearly decomposition step is carried out by a Singular Value Decomposition.

12. The image processing method of claim 10 wherein said step of removing said desired portion includes the sub-step of performing a spectral analysis on temporal components of said remaining modes.

13. The image processing method of claim 12 wherein said spectral analysis sub-step includes the further sub-step of determining predicted parts of an auxiliary time series related to said image data and subtracting said predicted parts from said temporal components, and wherein said frequency filtering step is applied to modes remaining after said subtraction.

14. The image processing method of claim 10 including the further step of reconstructing said extracted signal data into a form of a movie.

15. The image processing method of claim 10 wherein said image data is derived from images generated from a Magnetic Resonance Imaging scan.

16. A method for data compression by elimination of a portion of an aggregate of said data, said data having both temporal and spatial components, comprising the steps of:
   performing a linear decomposition of said aggregate data and thereafter discarding decomposition modes having component values that are lower than a first predetermined threshold value; and
   analyzing decomposition modes that remain after said discarding to determine if a set of said remaining modes exists in which a difference between ones of spatial components included in said set and a spatial derivative of an average of said aggregate data is less than a second predetermined threshold, and thereafter discarding any said set.

17. The data compression method of claim 16 wherein said step of performing a linear decomposition further includes the substeps of:
   forming said data into a matrix with spatial coordinates of said data along one dimension of said matrix and temporal coordinates along another dimension;
   augmenting said matrix in both said spatial and temporal dimensions by the addition of spatial and temporal shifted versions of said data.

18. The data compression method of claim 16 including the further step of
   performing a spectral analysis on temporal components of decomposition modes that remain after said discarding of said set; and
   frequency filtering of said then remaining modes using frequency range determined in said spectral analysis step to eliminate modes outside a range of said filter.

19. The data compression method of claim 18 wherein said spectral analysis step includes the sub-step of determining predicted parts of an auxiliary time series related to said aggregate data and subtracting said predicted parts from said temporal components, and wherein said frequency filtering step is applied to modes remaining after said subtraction.

20. A system for processing image data to extract a desired portion of said data, comprising:
   means for performing an augmented linear decomposition of said image data and thereafter discarding decomposition modes having component values that are lower than a first predetermined threshold value;
   means for analyzing remaining decomposition modes to determine a set of said remaining modes in which a difference between ones of spatial components included in said set and a spatial derivative of an average of said image data is less than a second predetermined threshold, and thereafter discarding said set;
   means for performing a spectral analysis on temporal components of then remaining decomposition modes; and
   means for frequency filtering of said then remaining modes using frequency range determined by said spectral analysis means to extract said desired portion.

21. The image processing system of claim 20 wherein said means for performing an augmented linear decomposition is implemented as a dedicated processor preprogrammed to carry out said augmented linear decomposition.

22. The image processing system of claim 20 wherein s aid means for performing a spectral analysis is implemented as a digital signal processor.

23. The image processing system of claim 20 further comprising means for reconstruction and display of said extracted desired portion.

24. A method for processing image data to extract a desired portion of said data, said data including at least a spatial component and a component related to a sequential position of said image, said method comprising the steps of:
   performing a linear decomposition of said image data and selecting decomposition modes having component values above a first predetermined threshold value; and
   analyzing said selected decomposition modes to determine if a set of said selected modes exists in which a difference between ones of spatial components included in said set and a spatial derivative of an average of said image data is less than a second predetermined threshold, and discarding any said set so determined, leaving a remainder of said selected decomposition modes.

25. The image processing method of claim 24 including the further steps of:

performing a spectral analysis on sequential-position-related components of said remainder; and frequency filtering of said modes in said remainder using a frequency range determined in said spectral analysis step to extract said desired portion.

26. The image processing method of claim 24 wherein said step of performing a linear decomposition further includes the substeps of:

forming said image data into a matrix with spatial coordinates of said data along one dimension of said matrix and coordinates of said sequential-position-related components along another dimension;

augmenting said matrix in both said spatial and said sequential-position-related dimensions by the addition of space and sequential-position shifted versions of said image data.

27. A method for processing image data to extract a desired portion of said data, comprising the steps of:

performing a linear decomposition of said image data and selecting decomposition modes having component values above a first predetermined threshold value;

analyzing said selected decomposition modes to determine if a set of said selected modes exists in which a difference between ones of spatial components included in said set and a spatial derivative of an average of said image data is less than a second predetermined threshold, and discarding any said set so determined, leaving a remainder of said selected decomposition modes;

performing a spectral analysis on temporal components of said remainder; and frequency filtering of said modes in said remainder using a frequency range determined in said spectral analysis step to extract said desired portion.

28. The image data processing method of claim 27 wherein said step of performing a linear decomposition further includes the substeps of:

forming said data into a matrix with spatial coordinates of said data along one dimension of said matrix and temporal coordinates along another dimension;

augmenting said matrix in both said spatial and temporal dimensions by the addition of spatial and temporal shifted versions of said data.

29. A method for processing image data to extract a desired portion of said data, comprising the steps of:

forming said image data into a matrix with spatial coordinates of said data along one dimension of said matrix and time along another dimension;

augmenting said matrix in both said spatial coordinate and said time dimensions by the addition of space and time shifted versions of said image data;

causing said augmented matrix to be linearly decomposed into a plurality of modes having static image components and time course components;

selecting decomposition modes having component values above a first predetermined threshold value;

analyzing said selected decomposition modes to determine if a set of said selected modes exists in which a difference between ones of spatial components included in said set and a spatial derivative of an average of said image data is less than a second predetermined threshold, and discarding any said set so determined, leaving a remainder of said selected decomposition modes;

extracting said desired portion of said data from said modes in said remainder by frequency domain filtering of said modes in said remainder.

* * * * *